Figure 1:
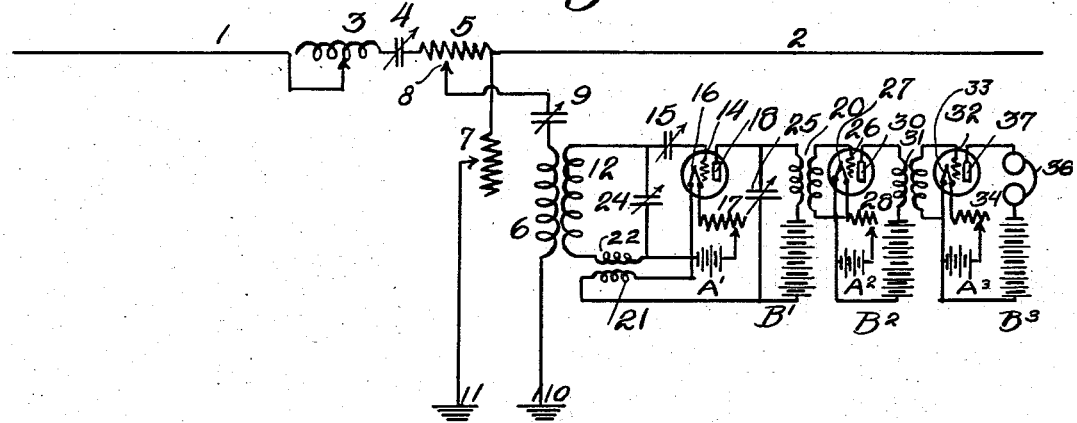

Sept. 18, 1923.

A. H. TAYLOR 1,468,049

SYSTEM FOR RECEIVING RADIOSIGNALS

Filed Oct. 9, 1918

Inventor
A. H. Taylor
By
Attorney

Patented Sept. 18, 1923.

1,468,049

UNITED STATES PATENT OFFICE.

ALBERT HOYT TAYLOR, OF GRAND FORKS, NORTH DAKOTA, ASSIGNOR TO RADIO CORPORATION OF AMERICA, OF NEW YORK, N. Y., A CORPORATION OF DELAWARE.

SYSTEM FOR RECEIVING RADIOSIGNALS.

Application filed October 9, 1918. Serial No. 257,528.

*To all whom it may concern:*

Be it known that I, ALBERT HOYT TAYLOR, a citizen of the United States, residing at Grand Forks, in the county of Grand Forks and State of North Dakota, have invented certain new and useful Improvements in Systems for Receiving Radiosignals, of which the following is a specification.

My invention relates broadly to wireless telegraphy and more particularly to a method of eliminating interference caused by induction and atmospheric disturbances occurring simultaneously with the reception of radio telegraphic and telephonic signals.

The object of my invention is to establish in a radio receiving system the combination of two circuits which possess a different ratio of signals to strays such that the combined received currents will have the static or strays cancelled leaving a readable value of signals. Another object of this invention is to provide an antenna system comprising two aperiodic collecting devices of proportioned lengths and areas in combination with means for balancing out the strays received and amplifying the resultant signals. A further object of my invention is to provide a balanced antenna system adapted for long range reception of damped and undamped waves so arranged that the antenna system may be in close proximity to the earth's surface.

Other and further objects of the present invention will in part be obvious and will in part be pointed out in the specification hereinafter following, and by reference to the drawings forming a part thereof in which like reference characters have been used to designate like parts in each of the diagrams.

Figure 2:
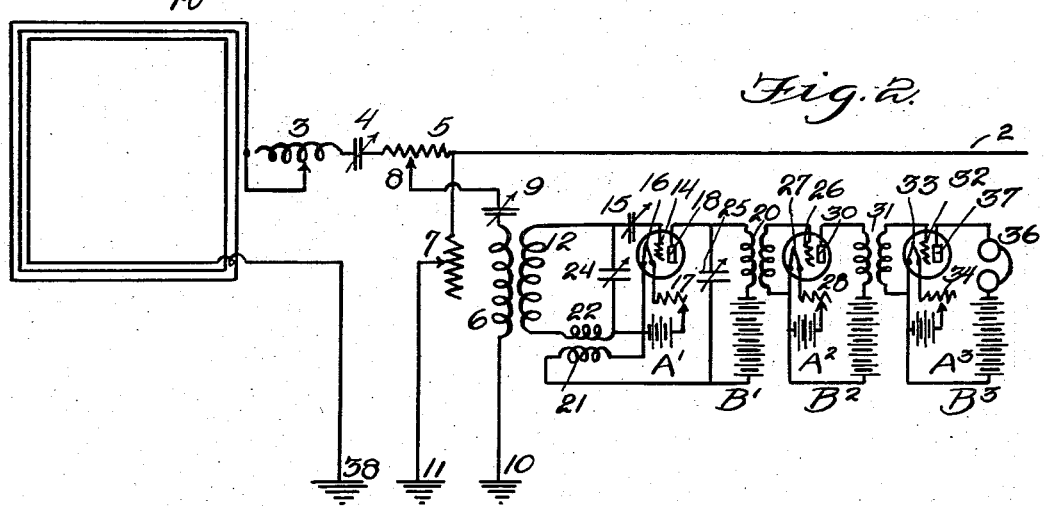
Figure 3:
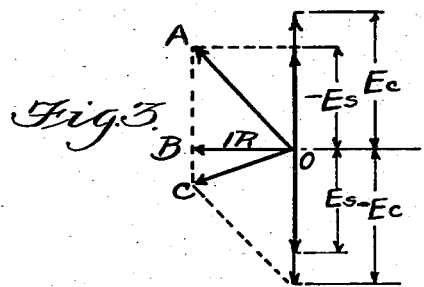

Figure 1 is an elementary diagram of the radio receiving system embodying an oscillating audion and a multiple step amplifier with the balance circuit connected between two linear collecting devices oppositely projected in the same horizontal plane. Fig. 2 is a diagram of a vertical rectangular loop collecting device combined with a linear cable collector used with the balance circuit and receiving apparatus. Fig. 3 is a vector analysis showing the theory of the phase changing device employed in the balance circuit.

I am aware that there are existing radio systems proposed for the elimination of static. The prior art can be classified broadly into two groups. One group includes special circuits for the elimination of atmospheric disturbances, which methods generally require especially designed apparatus entirely distinct from instruments in commercial use. The second generic group includes antenna systems positioned in proximity or beneath the surface of the earth where the electromagnetic wave components can be received with greater intensity than the associated electrostatic wave component. These systems are, however, more or less responsive to strays as well as to signals and in multi-stage amplifications strays are multiplied in addition to the signals. With the system herein described the conventional type of receiving apparatus is employed with an antenna circuit so arranged that a balance can be obtained between the signals and strays such that the signal audibility relative to the stray audibility is greatly improved and amplification causes an increase in the intensity. Where signals are unreadable with systems in present use by reason of the adverse influence of violent strays perfect reception of signals can be obtained by means of the proportioned collecting system and balance circuit set forth in the following description.

Referring more particularly to the drawings, Fig. 1 shows the stray eliminating circuit provided with two linear antenna collectors 1 and 2 projected in opposite directions in approximately the same horizontal plane in proximity to the surface of the earth. The collectors are aperiodic or nearly so, that is, incapable of being set into resonant oscillation by the incoming energy. Collector 1 is preferably stretched over moist earth, and collector 8 extended in the opposite direction over and under salt water on surface or sub-surface floats.

By reason of the relative lengths and position of the collectors, collector 1 used independently will favor strays, that is, the signal-stray ratio is more in favor of the strays, while collector 2 used independently is more favorable to signals, that is it has a ratio of signal to strays greater than collector 1. Collector 1 is connected through variable inductance 3 and variable capacity 4 with resistance coil 5. The opposite end of resistance 5 connects directly with antenna collector 2. Variable resistance 7 is shunted between the junction of collector 2 and resistance 5 with ground 11 to provide means for improving the signal to stray ratio of collector 2 more in favor of the signals. The collector system is connected to the primary of the receiving apparatus by means of contactor 8 adjustable on resistance 5. Variable condenser 9 is placed in series with contactor 8 and primary winding 6, the opposite end of the primary being grounded at 10 completing the primary oscillatory circuit. Secondary 12 is inductively coupled with primary coil 6 and may be connected in several different ways with the receiving instruments. By way of illustration I have shown the secondary connected in an oscillating audion circuit with the conventional two-stage amplifier although several additional stages may be employed as required.

One end of secondary winding 12 connects the grid 14 of the oscillating bulb through variable condenser 15. The filament 16 is energized by battery A' controlled through rheostat 17. The plate 18 is in circuit with the primary of the radio frequency transformer 20, high voltage battery B' and tickler coil 21 which connects with the positive terminal of battery A'. The coupled winding 22 which serves as a source of oscillation for coil 21 is placed in series with secondary 12 and filament 16. Variable condenser 24 is shunted across the secondary circuit and tuning condenser 25 is connected across the plate circuit. The secondary of the radio frequency transformer is placed across grid 26 and filament 27 of the first tube of the amplifier. The usual lighting circuit is completed through battery $A^2$ and rheostat 28. The plate 30 connects through the primary winding of the second radio frequency transformer 31 with high voltage battery $B^2$ from which the circuit is completed to the positive side of the lighting battery $A^2$. The connection of the second amplifying bulb is quite similar to the circuit just followed. Grid 32 connects through the secondary of transformer 31 with filament 33. Battery $A^3$ supplies the filament current through rheostat 34. The telephone receivers 36 are connected in the plate circuit between plate 37 and high voltage battery $B^3$ which in turn connects with filament 33.

Figure 2 shows a receiving system employing the same apparatus connection but provided with a loop form of collecting device 40 in lieu of the linear cable 1 shown in Fig. 1.

The loop collector is formed by winding a number of turns of cable on a suitably constructed vertical rectangular frame, the turns being carefully insulated from each other, with the beginning of the loop grounded as indicated at 38. The vertical loop is used by reason of its characteristic signal stray ratio in favor of the strays when used independently, that is its property of responding more readily to strays than signals. Collector 2 of Figure 2 is positioned and proportioned as previously pointed out in such manner that its signal-stray ratio is considerably better than the signal-stray ratio for the loop. Resistance 7 is connected as before in circuit with collector 2 and ground 11 to produce an improvement in the ratio of signals to strays received from collector 2 by providing a path for leakage of strays to the ground leaving a predominating signal oscillation. The variable inductance 3 and variable capacity 4 connected in the collecting system circuit with resistance 5 serve as a phase adjusting device for impulses coming in over collector 1. The received oscillations have certain characteristics which can be represented graphically to make the function of the phase adjusting device clearer. Fig. 3 shows the instantaneous relationship of the oscillatory current and E. M. F. caused by received impulses on collector 1 in the circuit included between this collector and ground 10. The current through the phase adjusting device is represented diagrammatically by vector IR which is directly proportional to the E. M. F. drop across the resistance in the circuit. The back E. M. F. due to self induction, vector $Es$ lags 90° behind the current or E. M. F. drop due to resistance and is therefore vertically downward. This vector is counterbalanced by the equal and opposite component $-Es$. Combining the E. M. F. vector IR with E. M. F. vector $-Es$ the resultant OA is obtained for the pressure across the phase adjuster when the capacity values are negligible. Another E. M. F. acts in the circuit however as indicated by vector $Ec$ which is the back E. M. F. of the condenser 90° ahead of the current. This is counterbalanced by an equal and opposite component $-Ec$ which is the terminal pressure of the condenser 4. The combination of the condenser terminal pressure $-Ec$ and OA, the pressure across inductance 3 and resistance 5, gives OC which represents the true pressure across the phase changing device in circuit with collector 1. By changing values of inductance, capacity and resistance the vector relationship of the impulses acting in the circuit will change and hence the circuit may be brought sharply in resonance with signals on a wave of particular phase characteristics.

Assuming the phase adjusting device so arranged that the circuit is in resonance with impulses received on collector 1, strays will predominate on collector 1 and signals will be received more favorably on collector 2. Variation of the slider contact 8 over resistance 5 adjusts the relative intensity of signals and strays received from the two collectors. The variation of the slider on resistance 7 produces an improvement in the ratio of signal to strays received from collector 2 and permits a better balancing out of strays to be obtained. In operation contactor 8 is positioned at the point of junction of the resistance with collector 2. The resistance 7 is adjusted to a trial value and the audion oscillator and amplifier manipulated as usual for the maximum audibility of signals. The contactor 8 is then moved to the opposite end of resistance 5. The condenser 4 and inductance 3 are next varied without changing the adjustments on the receiving set proper until the circuit is brought into resonance with the incoming signals. The contactor 8 is then moved back toward the junction of collector 2 with resistance 5, the condenser 4 being simultaneously adjusted for the most readable signal. This general procedure is continued until the maximum balance of the circuit is obtained at which time the strays are cancelled leaving the signals which are amplified in the receiving apparatus.

The receiving system described is particularly adapted for installation where the available territory is limited, and yet permits long range reception during heavy atmospheric disturbances. While I have set forth a specific embodiment of the invention it should be understood that modifications may be made within the scope of the appended claims without departing from the spirit of the invention.

In particular I find that it is often not necessary to use both collectors but that good results can be obtained by using one substantially aperiodic collector, such as 2, in combination only with the receiving circuits and the resistance circuit 7.

Having thus described my invention what I claim and desire to secure by Letters Patent is:

1. In a radio receiving system, a plurality of opposed collectors one of said collectors having the form of a vertical rectangular loop grounded at one end and connecting through a phase adjusting device in circuit with a resistance with the opposite collector, and means for balancing out the strays received on the respective collectors.

2. In a radio receiving system, the combination of oppositely positioned collecting devices, one of said collecting devices being a loop and the opposite collecting device being an extended cable, said loop having inherently a different signal-stray ratio than the said extended cable and means interposed between said collecting devices for further increasing the difference of the signal-stray ratios, and receiving apparatus associated with said collecting devices.

3. In a radio receiving system, the combination of a plurality of collectors, a receiving apparatus connected between said collectors and ground, the point of connection of the receiving apparatus to said collectors being substantially at their point of junction, and a separate circuit connected between said collectors and ground and containing high ohmic resistance relatively to its capacity and inductance.

4. In a radio receiving system, the combination of oppositely directed collectors, a receiving apparatus connected between said collectors and ground, the point of connection of the receiving apparatus to said collectors being substantially at their point of junction, and a separate circuit connected between said collectors and ground and containing substantially only pure resistance.

5. In a radio receiving system, the combination of a substantially aperiodic collector, a receiving apparatus connected between said collector and ground, and a second circuit also connected between said collector and ground, said second circuit being free from tuning with respect to the signal to be received and containing ohmic resistance.

6. In a radio receiving system, the combination of a substantially horizontal and substantially aperiodic collector, receiving apparatus connected between said collector and ground, and a non-oscillatory circuit also connected between said collector and ground and containing high ohmic resistance relatively to its capacity and inductance.

A. HOYT TAYLOR.